(12) United States Patent
Torrione

(10) Patent No.: US 11,906,283 B2
(45) Date of Patent: *Feb. 20, 2024

(54) SYSTEM AND METHOD FOR LOCATING, MEASURING, COUNTING, AND AIDING IN THE HANDLING OF DRILL PIPES

(71) Applicant: HELMERICH & PAYNE TECHNOLOGIES, LLC, Tulsa, OK (US)

(72) Inventor: Peter A. Torrione, Durham, NC (US)

(73) Assignee: HELMERICH & PAYNE TECHNOLOGIES, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,200

(22) Filed: Jun. 2, 2022

(65) Prior Publication Data
US 2022/0299313 A1    Sep. 22, 2022

Related U.S. Application Data

(63) Continuation of application No. 14/939,089, filed on Nov. 12, 2015, now Pat. No. 11,378,387.
(Continued)

(51) Int. Cl.
*G01B 11/08* (2006.01)
*G06T 7/00* (2017.01)
(Continued)

(52) U.S. Cl.
CPC ............ *G01B 11/08* (2013.01); *E21B 17/006* (2013.01); *E21B 19/06* (2013.01); *E21B 19/20* (2013.01);
(Continued)

(58) Field of Classification Search
CPC ....... G01B 11/08; G01B 11/02; G01B 11/022; E21B 17/006; E21B 19/06; E21B 19/20;
(Continued)

(56) References Cited

U.S. PATENT DOCUMENTS

| 4,610,005 A | 9/1986 | Utasi |
| 6,469,734 B1 | 10/2002 | Nichani et al. |

(Continued)

FOREIGN PATENT DOCUMENTS

| WO | 2016147045 A1 | 9/2016 |
| WO | 2017042677 A1 | 3/2017 |

(Continued)

OTHER PUBLICATIONS

U.S. Appl. No. 14/939,089, "Final Office Action", dated Jun. 15, 2021, 27 pages.
(Continued)

*Primary Examiner* — Jeffery A Williams
*Assistant Examiner* — Kristin Dobbs
(74) *Attorney, Agent, or Firm* — Kilpatrick Townsend & Stockton LLP

(57) ABSTRACT

Disclosed embodiments relate to systems and methods for locating, measuring, counting or aiding in the handling of drill pipes 106. The system 100 comprises at least one camera 102 capable of gathering visual data 150 regarding detecting, localizing or both, pipes 106, roughnecks 116, elevators 118 and combinations thereof. The system 100 further comprises a processor 110 and a logging system 114 for recording the gathered visual data 150. The method 200 comprises acquiring visual data 150 using a camera 106, analyzing the acquired data 150, and recording the acquired data 150.

25 Claims, 3 Drawing Sheets

Related U.S. Application Data

(60) Provisional application No. 62/078,577, filed on Nov. 12, 2014.

(51) Int. Cl.

| | | |
|---|---|---|
| G01B 11/02 | (2006.01) | |
| E21B 47/04 | (2012.01) | |
| E21B 41/00 | (2006.01) | |
| E21B 44/00 | (2006.01) | |
| E21B 19/20 | (2006.01) | |
| E21B 17/00 | (2006.01) | |
| E21B 19/06 | (2006.01) | |
| G08B 21/18 | (2006.01) | |

(52) U.S. Cl.
CPC .............. *E21B 41/00* (2013.01); *E21B 44/00* (2013.01); *E21B 47/04* (2013.01); *G01B 11/02* (2013.01); *G01B 11/022* (2013.01); *G06T 7/0004* (2013.01); *G08B 21/182* (2013.01); *G08B 21/187* (2013.01); *G06T 2207/30108* (2013.01)

(58) Field of Classification Search
CPC .......... E21B 41/00; E21B 44/00; E21B 47/04; G06T 7/0004; G08B 21/182; G08B 21/187
USPC ......................................................... 348/135
See application file for complete search history.

(56) References Cited

U.S. PATENT DOCUMENTS

| | | | |
|---|---|---|---|
| 7,874,351 | B2 | 1/2011 | Hampton et al. |
| 7,933,166 | B2 | 4/2011 | Goodman |
| 8,218,826 | B2 | 7/2012 | Ciglenec et al. |
| 8,233,667 | B2 | 7/2012 | Helgason et al. |
| 8,363,101 | B2 | 1/2013 | Gschwendtner et al. |
| 8,395,661 | B1 | 3/2013 | Olsson et al. |
| 8,547,428 | B1 | 10/2013 | Olsson et al. |
| 8,622,128 | B2 | 1/2014 | Hegeman |
| 8,812,236 | B1 | 8/2014 | Freeman et al. |
| 8,873,806 | B2 | 10/2014 | Kiest, Jr. |
| 9,041,794 | B1 | 5/2015 | Olsson et al. |
| 9,134,255 | B1 | 9/2015 | Olsson et al. |
| 9,279,319 | B2 | 3/2016 | Savage |
| 9,410,877 | B2 | 8/2016 | Maxey et al. |
| 9,464,492 | B2 | 10/2016 | Austefjord et al. |
| 9,518,817 | B2 | 12/2016 | Baba et al. |
| 9,651,468 | B2 | 5/2017 | Rowe et al. |
| 9,664,011 | B2 | 5/2017 | Kruspe et al. |
| 9,677,882 | B2 | 6/2017 | Kiest, Jr. |
| 9,706,185 | B2 | 7/2017 | Ellis |
| 9,869,145 | B2 | 1/2018 | Jones et al. |
| 9,912,918 | B2 | 3/2018 | Samuel |
| 9,915,112 | B2 | 3/2018 | Geehan et al. |
| 10,227,859 | B2 | 3/2019 | Richards et al. |
| 10,328,503 | B2 | 6/2019 | Osawa et al. |
| 10,982,950 | B2 | 4/2021 | Torrione |
| 11,378,387 | B2 | 7/2022 | Torrione |
| 11,592,282 | B2 | 2/2023 | Torrione |
| 2009/0159294 | A1* | 6/2009 | Abdollahi ................ E21B 19/14 166/77.52 |
| 2010/0328095 | A1 | 12/2010 | Hawthorn et al. |
| 2011/0280104 | A1 | 11/2011 | McClung, III |
| 2011/0308332 | A1 | 12/2011 | Blessum et al. |
| 2012/0123756 | A1 | 5/2012 | Wang et al. |
| 2012/0163932 | A1 | 6/2012 | Schmidt et al. |
| 2012/0188090 | A1* | 7/2012 | Wessling ............ E21B 47/0025 340/853.1 |
| 2012/0328095 | A1 | 12/2012 | Takahashi et al. |
| 2013/0236064 | A1 | 9/2013 | Li et al. |
| 2013/0265409 | A1 | 10/2013 | Tjhang et al. |
| 2013/0275100 | A1* | 10/2013 | Ellis .................. E21B 19/20 703/2 |
| 2013/0345878 | A1 | 12/2013 | Austefjord et al. |
| 2014/0002617 | A1 | 1/2014 | Zhang et al. |
| 2014/0326505 | A1 | 11/2014 | Davis et al. |
| 2014/0333754 | A1 | 11/2014 | Graves et al. |
| 2015/0075866 | A1 | 3/2015 | Tjhang |
| 2015/0114634 | A1 | 4/2015 | Limbacher |
| 2015/0134257 | A1 | 5/2015 | Erge et al. |
| 2015/0138337 | A1 | 5/2015 | Tjhang et al. |
| 2015/0218936 | A1 | 8/2015 | Maher et al. |
| 2015/0345261 | A1* | 12/2015 | Kruspe .................. E21B 47/16 175/40 |
| 2017/0089153 | A1 | 3/2017 | Teodorescu |
| 2017/0152729 | A1 | 6/2017 | Gleitman et al. |
| 2017/0161885 | A1 | 6/2017 | Parmeshwar et al. |
| 2017/0167853 | A1 | 6/2017 | Zheng et al. |
| 2017/0284184 | A1 | 10/2017 | Anghelescu et al. |
| 2017/0322086 | A1 | 11/2017 | Luharuka et al. |
| 2018/0180524 | A1 | 6/2018 | Francois et al. |
| 2019/0100988 | A1 | 4/2019 | Ellis et al. |
| 2019/0102612 | A1 | 4/2019 | Takemoto et al. |
| 2019/0136650 | A1 | 5/2019 | Zheng et al. |
| 2019/0141294 | A1 | 5/2019 | Thorn et al. |
| 2019/0206068 | A1 | 7/2019 | Stark et al. |

FOREIGN PATENT DOCUMENTS

| | | | |
|---|---|---|---|
| WO | 2017132297 | A2 | 8/2017 |
| WO | 2017176689 | A1 | 10/2017 |
| WO | 2018093273 | A1 | 5/2018 |
| WO | 2018131485 | A1 | 7/2018 |
| WO | 2018148832 | A1 | 8/2018 |
| WO | 2018157513 | A1 | 9/2018 |

OTHER PUBLICATIONS

U.S. Appl. No. 14/939,089, "Final Office Action", dated May 5, 2020, 21 pages.
U.S. Appl. No. 14/939,089, "Non-Final Office Action", dated Mar. 14, 2018, 21 pages.
U.S. Appl. No. 14/939,089, "Non-Final Office Action", dated Oct. 28, 2021, 15 pages.
U.S. Appl. No. 14/939,089, "Non-Final Office Action", dated Oct. 6, 2016, 18 pages.
U.S. Appl. No. 14/939,089, "Notice of Allowance", dated Mar. 2, 2022, 7 pages.
U.S. Appl. No. 16/502,689, "Non-Final Office Action", dated Aug. 4, 2020, 25 pages.
U.S. Appl. No. 16/502,689, "Notice of Allowance", dated Nov. 25, 2020, 5 pages.
U.S. Appl. No. 17/192,735, "Final Office Action", dated Feb. 11, 2022, 38 pages.
U.S. Appl. No. 17/192,735, "Non-Final Office Action", dated Sep. 21, 2021, 36 pages.
International Application No. PCT/US/2015/060318, "International Search Report and Written Opinion", dated Jan. 28, 2016, 11 pages.
International Application No. PCT/US2015/060318, "International Search Report and Written Opinion", dated Jan. 28, 2016, 7 pages.
U.S. Appl. No. 17/192,735, "Non-Final Office Action", dated Jul. 6, 2022, 24 pages.
U.S. Appl. No. 17/192,735, "Notice of Allowance", dated Oct. 27, 2022, 9 pages.
U.S. Appl. No. 18/159,672, "Non-Final Office Action", dated Jun. 8, 2023, 52 pages.
Canadian Application No. 2967797, "Office Action", dated Apr. 5, 2023, 6 pages.
Canadian Application No. 2967797, "Office Action", dated Jun. 3, 2022, 10 pages.
U.S. Appl. No. 18/159,672, "Final Office Action", dated Oct. 17, 2023, 26 pages.
U.S. Appl. No. 18/159,672, "Notice of Allowance", dated Dec. 21, 2023, 6 pages.

* cited by examiner

SYSTEM AND METHOD FOR LOCATING, MEASURING, COUNTING, AND AIDING IN THE HANDLING OF DRILL PIPES

CROSS-REFERENCES TO RELATED APPLICATIONS

This application is a continuation and claims the benefit of priority of U.S. application Ser. No. 14/939,089, filed on Nov. 12, 2015 and entitled SYSTEM AND METHOD FOR LOCATING, MEASURING, COUNTING, AND AIDING IN THE HANDLING OF DRILL PIPES, which claims the benefit of U.S. Provisional Application No. 62/078,577, filed on Nov. 12, 2014 and entitled SYSTEM AND METHOD FOR LOCATING, MEASURING, COUNTING, AND AIDING IN THE HANDLING OF DRILL PIPES, both of which are hereby incorporated by reference in their entireties.

FIELD OF THE INVENTION

Embodiments described herein relate to systems and methods for locating, measuring, counting, and aiding in the handling of drill pipes.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

Handling and counting of drill pipes on a rig is typically accomplished using primarily human-in-the-loop techniques. For example, a person is responsible for maintaining an accurate log of the types, diameters and lengths of pipes entered into the well-bore as drilling progresses and responsible for counting pipes as they are removed from the well-bore. Although a relatively simple human endeavor, errors in pipe tallying can and do occur, and these errors can cause significant disruptions to drilling activities.

Classical instrumentation for pipe tallying is either time-consuming (e.g., manual measurement of each pipe) or not suitable for harsh down-well conditions (e.g., RFID tagging). In contrast, computer vision technologies can be utilized to perform many of the activities currently undertaken manually, providing significant savings in drilling time and cost and reducing the risk from pipe tally errors. These techniques provide a more accurate technique for generating pipe tallies and can significantly reduce rig down-time due to pipe tally errors; potentially saving millions of dollars per year. Therefore, there is a need for an automated computer vision based technique for measuring pipe lengths and diameters, and counting pipe segments as they enter into or are removed from the well-bore.

DETAILED DESCRIPTION

Figure 1:
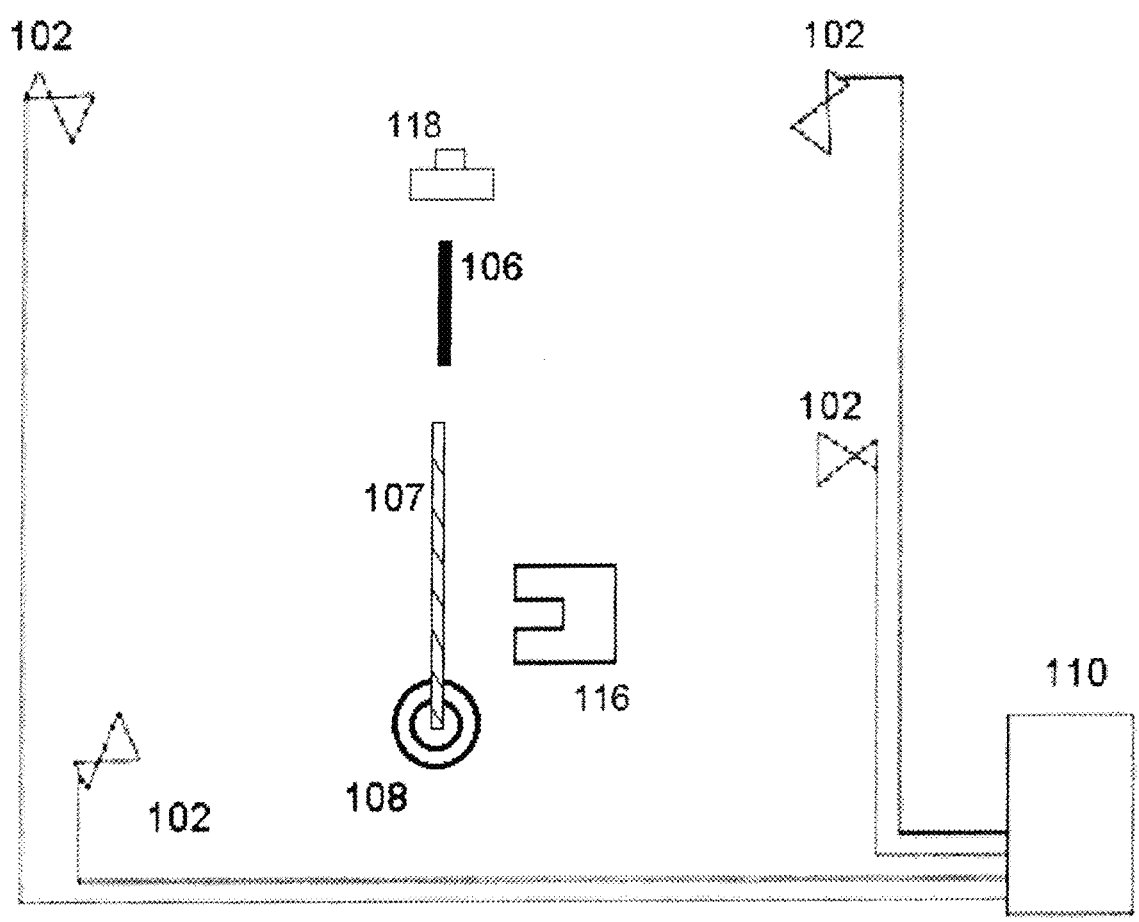
FIG. 1 depicts one of many embodiments of a system involving multiple cameras and CPUs for monitoring drilling pipe and assisting in drilling pipe handling.

The "Pipe Tally System" system, PTS, consists of several parts. In one preferred embodiment, one or more video cameras 102 positioned so as to be able to see the drilling pipe 106 as it is attached to, or removed from the drill-string 107. Depending on requirements, one camera 102 at sufficient distance from the bore-hole 108 to view the entire pipe 106 segment at once may be sufficient, otherwise two or more cameras 102 may be used, each of which may only see part of the pipe 106 as it is entered into the drill-string 107, but information or data 150 can be aggregated across the different cameras using the known camera positions and poses.

Each camera 102 may contain or be connected to a computer 110 which detects and localizes pipes 106, the iron roughneck 116, the elevator 118, or other relevant components. Different regions of interest for each object type can be defined using the known camera 102 geometry, or using user-inputs. Since the cameras 102 are at known distances from the bore-hole 108, camera transform information can be used to calculate the pipe lengths and diameters as they are tracked into and out of the well-bore 108. Information about the well-state, including the number of pipe stands and pipe segments 106 in the well may be accumulated on a central computing resource 110. In an alternative embodiment involving multiple cameras 102, pipe length, diameter, location and tracking information may be calculated by accumulating information 150 about the pipe 106 across multiple camera feeds.

Pipes 106 on a rig may be marked with paint or other marking system to make them easier to detect (e.g., a colorful stripe of paint near either end of the pipe 106 can help in detection, localization and length estimation).

In certain embodiments, the resulting information 150 about pipes 106 may be amalgamated into an automatically generated well-state report which may include a pipe tally (information about the pipe lengths and diameters, time the pipe 106 was added to or removed from the drill-string 107, or any other pipe 106 specific information). Automatic alarms 120 may be raised to the attention of the drill team (1) if at any time the automatic pipe tally does not match a manually generated pipe tally, (2) if a new piece of pipe 106 being added to the drill-string 107 is not commensurate with the current drill-string 107 (e.g., wrong pipe diameter), or (3) any other condition arises in which an alarm 120 is desired.

In FIG. 1, cameras 102 are mounted around the drill-string 107, oriented to be able to see new segments of pipe 106 as they are added to the drill-string 107, or as they are removed from the drill-string 107. If the rig design allows it, one camera 102 may be sufficient. Alternatively, multiple cameras 102, each of which may only be able to see part of the pipe 106 can also be utilized. In some embodiments, cameras 102 may also be able to see well-bore 108, rough neck 116 and elevator 118. Processor 110 is connected to cameras 102 and capable of analyzing the visual data 150 gathered by the cameras 102.

Figure 2:
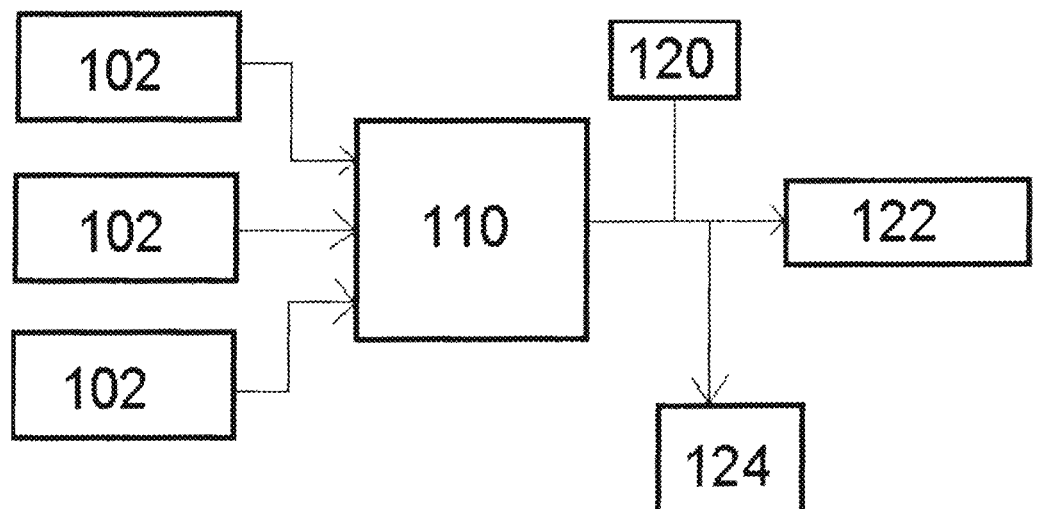
FIG. 2 depicts a potential series of steps involved in a system for monitoring drilling pipe and assisting in drilling pipe handling.

In FIG. 2, a potential configuration of the disclosed system is shown. Cameras 102 are connected to processor 110. Processor 110 may be connected to a logging system 122, an alarm 120 and/or a display device 124. It will be appreciated that many embodiments may contain greater or fewer cameras 102, processors 110 or other components than specifically shown in FIG. 2.

Figure 3:
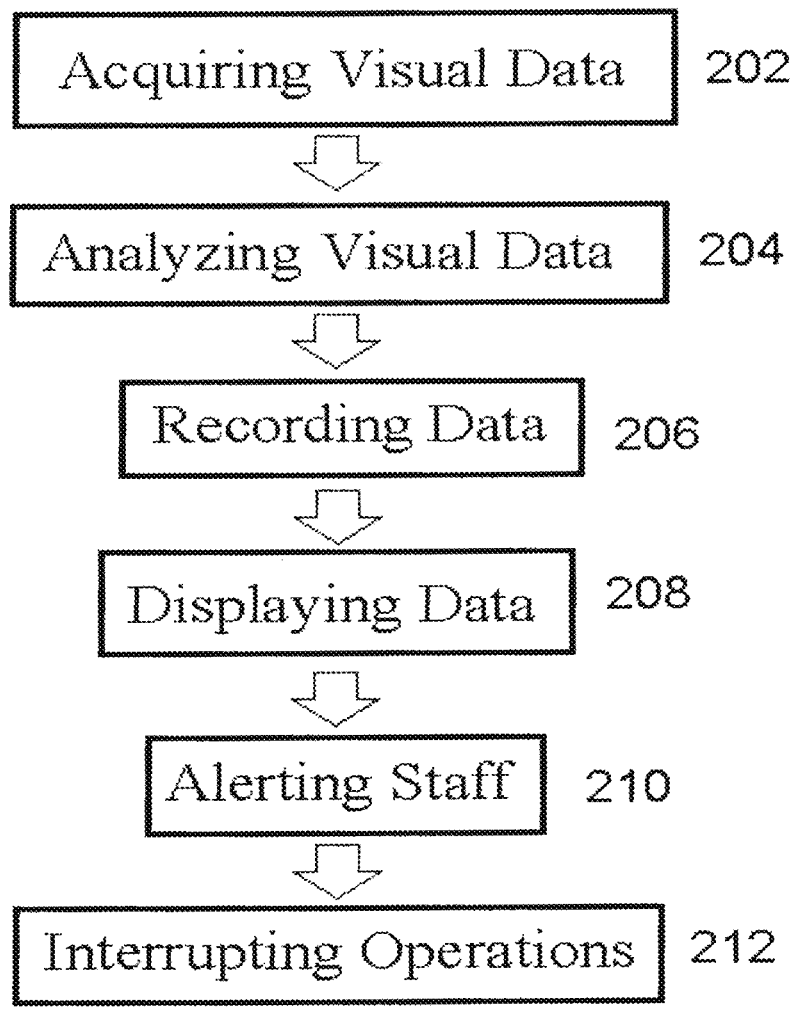
FIG. 3 depicts a potential series of steps involved in visually analyzing pipe detection.

FIG. 3 shows the steps involved in a potential method for locating, measuring, counting, and/or aiding in the handling of drill pipes. The method includes acquiring visual data 202, analyzing visual data 204, recording data 206, displaying data 208, alerting staff 210 and interrupting operations 212.

Specific regions of the scene (region of interest) may be identified during installation to specify the location of the vertical region above the well-bore 108, the location of the iron roughneck 116, or other relevant locations in each camera's 102 field of view.

During installation, the locations and poses of each camera 102 may be recorded. Camera locations can be finely estimated using standard camera calibration techniques (e.g., fiducial objects of known size and location in each camera's 102 field of view) immediately after installation, or whenever the cameras 102 have moved enough to require re-calibration.

In the case of multiple cameras 102, at least one camera 102 should be able to see the top and another camera 102 see the bottom of the pipe 106 at the same time when the pipe 106 is directly above the drill-string 107.

Pipe 106, roughneck 116 and/or elevator 118 detection may be accomplished using a combination of techniques. In an alternative embodiment, adaptive background estimation and subtraction models (e.g., adaptive Gaussian mixture models) may be applied to perform foreground and/or background segmentation. Since the background should be relatively stable over the time-frames during which each object is in-frame, adaptive background updating can be halted when a specific object is detected. This prevents the background estimation from "learning" the pipe 106 as part of the background. Furthermore, shape and size constraints can be applied to reduce false-alarms due to other non-pipe related changes in the scene. Pipes 106 used in drilling are long and narrow, and the diameters of the pipes 106 under consideration are tightly constrained. As a result, object aspect ratio and object size (given known camera 102 location relative to the drill-string 107) can be used to reduce non-pipe false alarms.

Changes in the background that are approximately the correct size and shape are then sent to a confirmation step, which takes into account features extracted from the detected regions. These features include pixel values, color histograms, and texture features, since each of these is indicative of the material composition of the object under consideration. A support vector machine trained to recognize pipe 106, roughneck 116, and/or elevator 118 like regions is then applied to the features extracted from each foreground region. The detections may be input into a finite state machine (FIG. 4).

Finite state machine logic systems may be used to ensure that the pipe tally is accurate by ensuring that the computer vision system 100 only increments the pipe tally when a suitable series of events has transpired. FIG. 4 shows a finite state machine which may be used for incrementing the pipe tally during tripping out of the hole.

In each state, state specific variables may be calculated and recorded. For example, the pipe tracker uses a combination of point-matching (using Harris features and SIFT and BRIEF descriptors) within the pipe region, as well as Lucas-Kanade optical-flow techniques to estimate the per frame velocity of the pipe 106. If the aggregate motion of the pipe 106 is "in well" (down), the pipe 106 is considered added to the drill-string 107, and this is marked in the pipe tally. If the aggregate motion of the pipe 106 is "out of well" (up), the pipe 106 is considered removed from the drill-string 107, and this is marked in the pipe tally.

Once a pipe 106 is tracked, its length and diameter may be constantly estimated and updated over time as long as the pipe 106 is in-frame. Estimation of the pipe length and diameter are possible since the aggregate change detection and pipe detection steps described above result in a bounding-box in image space containing the projection of the pipe 106 into the frame. Given the pixels comprising the pipe 106, and the camera 102 location and pose information, it is possible to measure the pipe diameter and length. These measurements are refined over time to reduce uncertainty and noise due to inter-pixel variance.

When the pipe 106 exits the scene (whether into or out of the well), the average measured pipe length and diameter may be provided to the pipe tally. For pipes 106 exiting the well, if these values do not agree with the same values measured when the pipe 106 entered the well, an alarm 120 may be raised. For pipes 106 entering the well, if these values are outside the normal bounds, or are not commensurate with the previous pipe 106 to enter the well, an alarm 120 may be raised.

Embodiments disclosed herein may relate to a system for locating, measuring, counting or aiding in the handling of drill pipes 106. The system may include at least one camera 102 which is operably connected to at least one processor 110. The camera 102 may be capable of gathering visual data 150 regarding detecting and/or localizing components of a drilling rig which may include pipes 106, drill pipes, roughnecks 116, elevators 118, drill-string components and combinations thereof. The processor 110 may be configured to analyze the visual data and may also be operably connected to the pipe elevator 118. The processor may be configured to halt elevator 118 operations when the visual data is outside of a pre-determined set of conditions. The system may also include at least one logging system 124 connected to said processor 110 for recording said visual data 150 and any analyzed data.

Certain embodiments may also include a display system 122 for displaying the collected and/or analyzed data. Embodiments may include a camera 102 which also comprises the processor 110. Embodiments of the system may also include an alarm 120 for alerting staff to the occurrence of a predetermined condition.

Disclosed embodiments may also relate to a method for locating, measuring, counting or aiding in the handling of drill pipes. The method includes acquiring visual data from at least one camera 102, analyzing said visual data 150, recording said analyzed data and disrupting the operations of a pipe elevator in response to a pre-determined condition.

Certain embodiments may also include displaying the acquired, analyzed or recorded data on a display device 122.

Embodiments may also include alerting staff to any occurrence of a pre-determined condition or any measurement that falls outside of a pre-determined range using an alarm 120.

Additional embodiments relate to a system for assisting in the handling of drill pipe segments. The system may include a well-bore 108 which is being worked by a drill-string 107. The drill-string 107 may comprise a plurality of drill pipe 106 segments. The system may also contain at least one camera 102 configured to observe the addition or subtraction of drill pipe 106 segments to the drill-string 107 and gathering visual data 150. The camera 102 may be operably connected to a processor 110. The process 110 may be capable of analyzing the visual data 150.

Certain embodiments may also include a logging system 124 connected to the processor 110. Embodiments may also include a display system 122 for displaying the collected and/or analyzed data. Some embodiments may include a camera 102 which includes a processor 110. Embodiments may also contain an alarm 120 for alerting staff of the occurrence of a pre-determined condition.

What is claimed is:

1. A system for handling drill pipe, the system comprising a computer system coupled to a drill pipe elevator or roughneck associated with a drilling rig, wherein the computer system is adapted to:
    receive image data from at least one camera at a drill site, wherein the camera has a field of view comprising a space above a borehole of a well;
    determine, responsive to the image data, a pipe in the field of view and a diameter of the pipe;
    determine, responsive to the diameter of the pipe, if a pre-determined condition has occurred; and
    adjust or halt a drill pipe elevator operation or a roughneck operation upon determining that the pre-determined condition has occurred.

2. The system of claim 1, further comprising the at least one camera.

3. The system of claim 1, wherein said at least one camera comprises at least one processor.

4. The system of claim 1, wherein the computer system is further adapted to:
    generate a well state report comprising a pipe tally responsive to the image data;
    determine, responsive to the image data, an aggregate motion of the drill pipe within the field of view relative to the borehole; and
    update the well state report based on the determined aggregate motion being in well or out of well relative to the borehole.

5. The system of claim 1, wherein the computer system is adapted to determine if the pre-determined condition has occurred by:
    estimating an enter length and diameter of the drill pipe entering the borehole based on the image data;
    estimating an exit length and diameter of the drill pipe exiting the borehole based on the image data;
    comparing the exit length and diameter with the enter length and diameter; and
    determining the pre-determined condition has occurred based on the exit length and diameter being outside of a tolerance of the enter length and diameter.

6. The system of claim 1, wherein the computer system is adapted determine if the pre-determined condition has occurred responsive to a detection of a marking system on the drill pipe in the image data.

7. The system of claim 1, further comprising at least one display system for displaying collected or analyzed data responsive to the image data.

8. The system of claim 1, further comprising an alarm for alerting staff to the occurrence of the pre-determined condition.

9. A method for handling of a drill pipe, the method comprising:
    acquiring visual data from at least one camera at a drill site, wherein the camera has a field of view comprising a space above a borehole of a well,
    analyzing said visual data and detecting an object in the visual data as the drill pipe;
    determining, responsive to the visual data, a diameter of the drill pipe;
    determining, responsive to the diameter of the drill pipe, if a pre-determined condition has occurred; and
    adjusting or halting a drill pipe elevator operation or a roughneck operation upon determining that the pre-determined condition has occurred.

10. The method of claim 9, further comprising detecting an aggregate motion of the drill pipe responsive to the visual data and relative to the borehole, and wherein determining if the pre-determined condition has occurred is further responsive to the detected aggregate motion of the drill pipe.

11. The method of claim 9, further comprising:
    recording the visual data from the at least one camera; and
    displaying recorded data on a display.

12. The method of claim 9, further comprising generating an alert upon determining that the pre-determined condition has occurred.

13. A non-transitory computer readable storage medium comprising a plurality of instructions executable by one or more processors, the instructions comprising instructions which, when executed on the one or more data processors, cause the one or more data processors to perform actions including:
    acquiring visual data from at least one camera at a drill site, wherein the camera has a field of view comprising a space above a borehole of a well,
    analyzing said visual data and detecting an object in the visual data as a drill pipe;
    determining, responsive to the visual data, a diameter of the drill pipe;
    determining, responsive to the diameter of the drill pipe, if a pre-determined condition has occurred; and
    providing instructions to adjust or halt a drill pipe elevator operation or a roughneck operation upon determining that the pre-determined condition has occurred.

14. The non-transitory computer readable storage medium of claim 13, wherein the instructions further comprise instructions which, when executed on the one or more data processors, cause the one or more data processors to perform actions including:
    generating a well state report comprising a pipe tally responsive to the visual data;
    determining, responsive to the visual data, an aggregate motion of the drill pipe within the field of view relative to the borehole; and
    updating the well state report based on the determined aggregate motion being in well or out of well relative to the borehole.

15. The non-transitory computer readable storage medium of claim 13, wherein the instructions further comprise instructions which, when executed on the one or more data processors, cause the one or more data processors to perform actions including:

estimating an entry length and diameter of the drill pipe entering the borehole based on the visual data;
estimating an exit length and diameter of the drill pipe exiting the borehole based on the visual data;
comparing the exit length and diameter with the entry length and diameter; and
determining the pre-determined condition has occurred based on the exit length and diameter being outside of a tolerance of the entry length and diameter.

16. The non-transitory computer readable storage medium of claim 13, wherein the instructions further comprise instructions which, when executed on the one or more data processors, cause the one or more data processors to perform actions including:
determining if the pre-determined condition has occurred responsive to a detection of a marking system on the drill pipe in the visual data.

17. The non-transitory computer readable storage medium of claim 13, wherein the instructions further comprise instructions which, when executed on the one or more data processors, cause the one or more data processors to perform actions including displaying collected or analyzed data responsive to the visual data.

18. The non-transitory computer readable storage medium of claim 13, wherein the instructions further comprise instructions which, when executed on the one or more data processors, cause the one or more data processors to perform actions including alerting staff to the occurrence of the pre-determined condition.

19. A computer vision system for drilling, the system comprising:
a computer system adapted to receive image data from at least one camera at a drill site, wherein the camera has a field of view comprising a space above a borehole of a well being drilled, and wherein the computer system comprises a processor adapted to execute instructions for:
determining, responsive to the image data, a diameter of a pipe;
determining, responsive to the diameter of the pipe, if a pre-determined condition has occurred; and
adjusting or halting a drill pipe elevator operation or a roughneck operation upon determining that a pre-determined condition has occurred.

20. The computer vision system of claim 19, wherein the pre-determined condition comprises an incorrect pipe diameter for a current drill string.

21. The computer vision system of claim 20, wherein determining the diameter of the pipe comprises determining an average of the diameter of the pipe.

22. The computer vision system of claim 21, wherein determining the diameter of the pipe is responsive to a number of pixels of the image data that comprise the pipe.

23. The computer vision system of claim 22, wherein the instructions further comprise instructions for determining a length of the pipe.

24. The computer vision system of claim 23, wherein the instructions further comprise instructions for updating a pipe tally responsive to the determination of the diameter and length of the pipe.

25. The computer vision system of claim 21, wherein the instructions further comprise instructions for generating an alarm if the pre-determined condition has occurred.

* * * * *